United States Patent [19]
Ricketts

[11] Patent Number: 5,950,566
[45] Date of Patent: Sep. 14, 1999

[54] MULTI-DIRECTIONAL TELESCOPING RESTRAINING CAGE FOR ANIMALS

[75] Inventor: Tod A. Ricketts, El Paso, Tex.

[73] Assignee: Animal Restraint Company, El Paso, Tex.

[21] Appl. No.: 08/961,353

[22] Filed: Oct. 30, 1997

[51] Int. Cl.[6] .................................................. A01K 1/03
[52] U.S. Cl. ............................................................. 119/473
[58] Field of Search ................................. 119/472, 473, 119/522, 523, 461, 474, 482, 491, 492, 498, 507, 513

[56] References Cited

U.S. PATENT DOCUMENTS

| | | | |
|---|---|---|---|
| 3,760,768 | 9/1973 | Patterson | 119/473 |
| 5,233,939 | 8/1993 | Randolph | 119/473 |
| 5,251,572 | 10/1993 | Frame et al. | 119/473 |
| 5,571,241 | 11/1996 | Nagata | 119/473 |

*Primary Examiner*—Thomas Price
*Attorney, Agent, or Firm*—Arnold White & Durkee

[57] ABSTRACT

A cage that includes two or more movable "walls" that can restrain an animal in two or more dimensions is disclosed. Preferably, the invention includes "telescoping" or movable planar surfaces, one preventing an animal's lateral movement, and another preventing vertical movement. An animal restrained in the inventive cage reduces the possibility of injury to the handler and the animal. In addition, it can be used to accommodate animals of differing sizes, because the walls of the disclosed restraining cage are movable.

4 Claims, 10 Drawing Sheets

FIG 10 and 126; and

MULTI-DIRECTIONAL TELESCOPING RESTRAINING CAGE FOR ANIMALS

BACKGROUND OF THE INVENTION

1. Field of Invention

This invention relates to an adjustable cage for handling animals. More specifically, the invention relates to a cage in which at least two sides are movable to restrain or limit the animal in at least two dimensions.

2. Background

Animal handlers such as veterinarians are in danger of serious injury when handling potentially dangerous animals. For instance, veterinarians provide medical attention, inoculations and hygienic care to canines, felines, and primates which involve close-quarter handling. As such, veterinarians are in constant danger of being bitten, clawed or otherwise attacked by the animal.

Attempts have been made to design a restraining cage that prohibit an animal's movement inside of the cage. For example, U.S. Pat. Nos. 5,282,441 and 5,441,016, issued to the inventor, Tod Allen Ricketts, disclose restraining cages. Such cages can be used to pin the sides of an animal between the movable and a stationary wall or to restrain specific portions of the animal such as its neck. Those arrangements allow a handler access to the animal in a manner safer than when the animal is unrestrained inside the cage.

Such restraining cages restrict the animal's movement in at least one dimension (e.g., from "side-to-side," also known as lateral). However, movement of the animal in other dimensions (e.g., "front-to-back," also known as the "linear" dimension, and "up-and-down," also known as the "vertical" dimension) may be possible. Animals that display aggressive or apprehensive behavior may use this freedom to harm themselves or their handlers.

Sedation may be a possible solution; but, the use of sedatives can have negative effects. Lifting the animal is another but that also has drawbacks. Thus, a need exists for an improved restraint cage design which can restrict an animal's movement within a cage in more than one dimension without lifting the animal.

SUMMARY OF THE INVENTION

The present inventive cage enables a handler to restrain an animal in at least two dimensions. The inventive cage includes at least two "telescoping," movable planar surfaces (such as a wall, a door, the ceiling and/or the floor), that prevent an animal's movement in at least two dimensions. For instance, a preferred cage includes a movable ceiling and one moveable wall. An animal restrained in that manner reduces the possibility of harm to the handler and the animal. In addition, the planar surfaces can be adjusted and set to accommodate all sorts of animals of all sorts of sizes.

DESCRIPTION OF THE PREFERRED EMBODIMENT

The detailed description identifies various aspects of the present invention by way of example and not by way of limitation. One of ordinary skill in the art will realize when reading this description that other designs are available to accomplish the purpose of this invention without deviating from the spirit of this invention.

A. Structure

Figure 1:
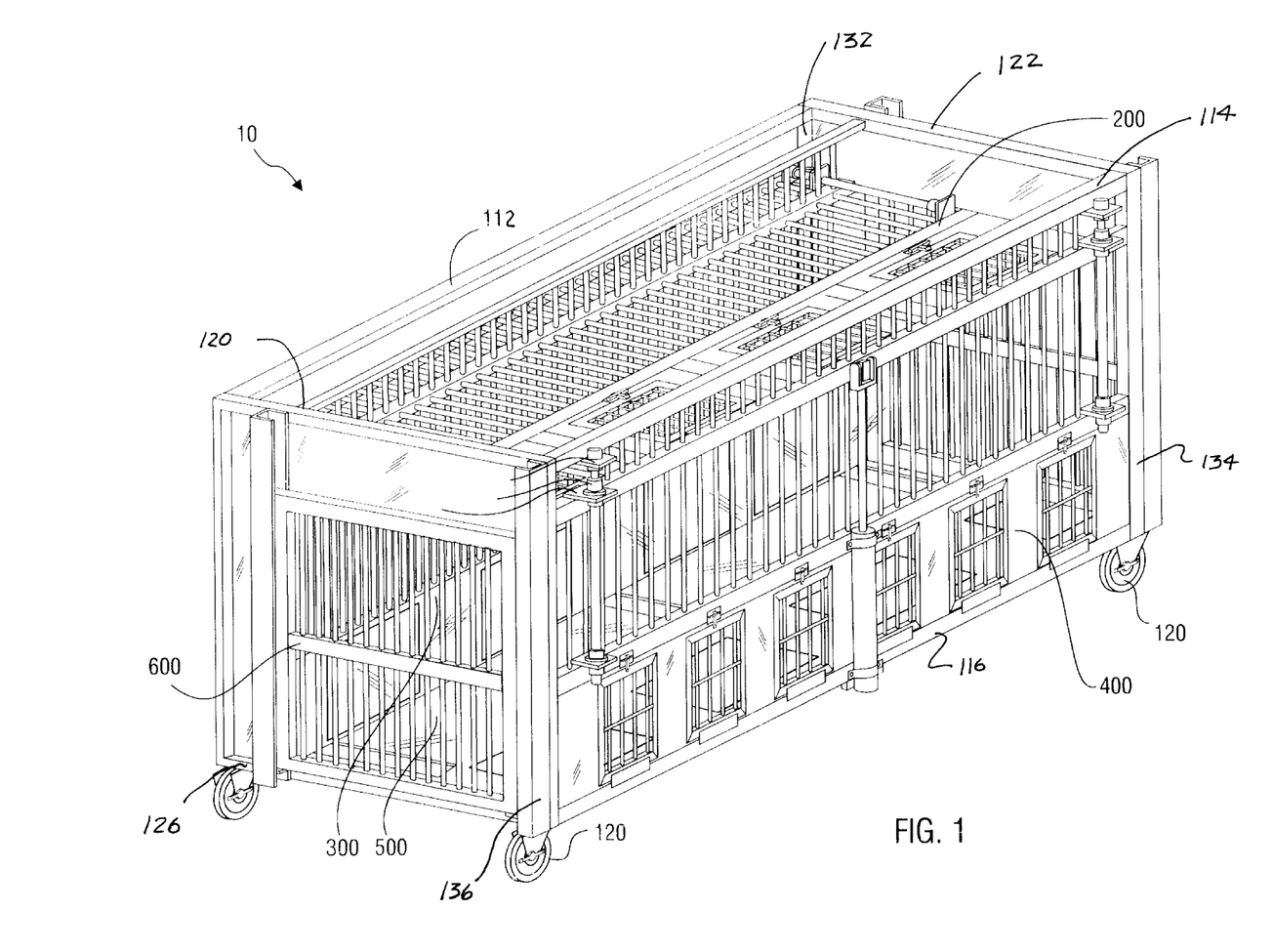
FIG. 1 illustrates an isometric view of the inventive cage.

The inventive cage 10 is shown in FIG. 1. Generally, cage 10 is comprised of a frame 100 within which a ceiling 200, movable wall 300, wall 400, floor 500, and doors 600 are disposed. A drive system 700 is also included to accommodate and control movement of the moveable wall 300 and ceiling 200.

The frame 100 includes longitudinal members 112, 114, 116 and 118; horizontal members 120, 122, 124 and 126; and vertical member 130, 132, 134 and 136 that are shown in FIGS. 1–9. Preferably, the frame members are disposed to form a rectangular box.

1. Ceiling 200

Figure 2:
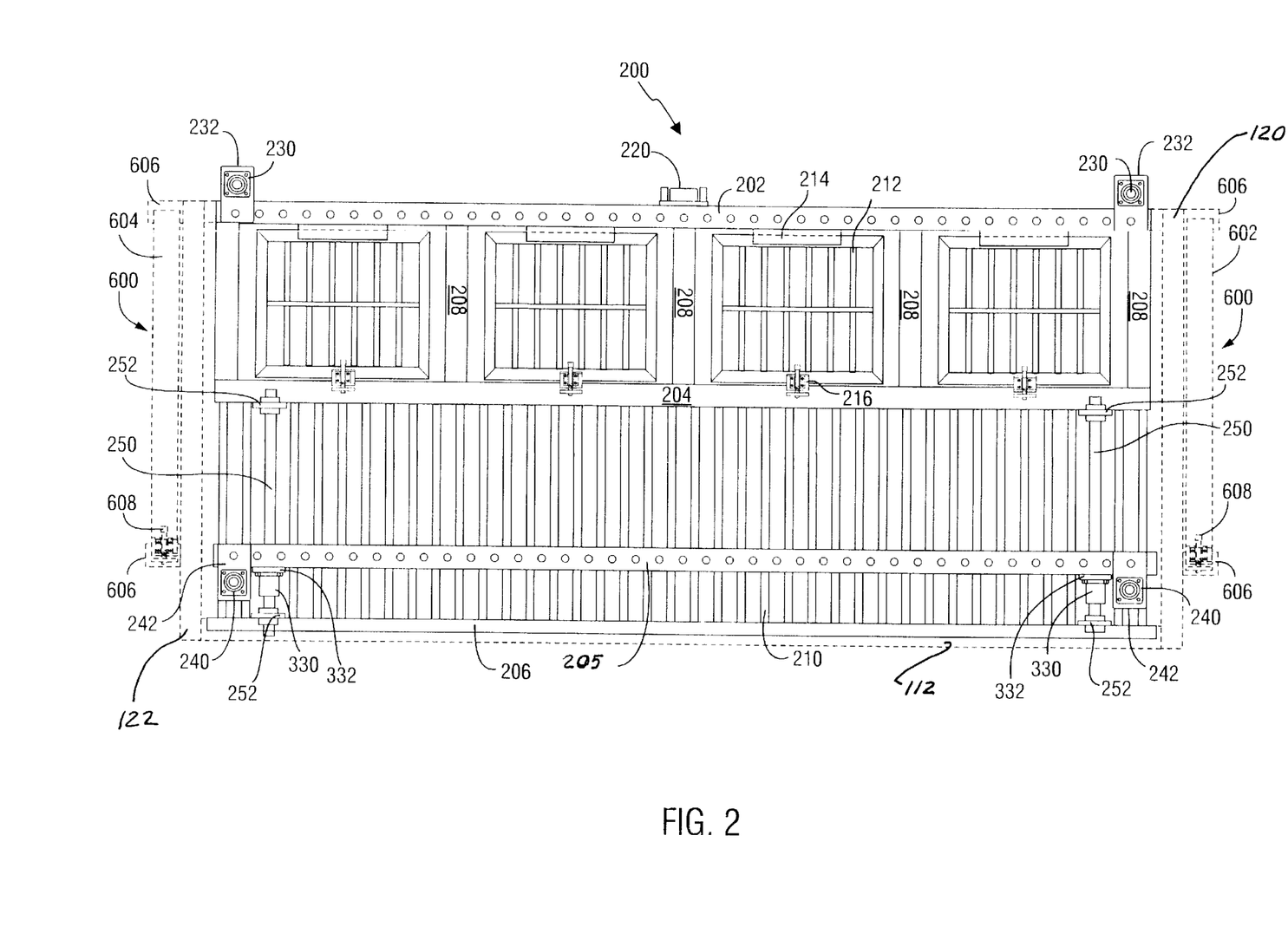
FIG. 2 illustrates the preferred ceiling.

FIG. 2 shows the ceiling 200 which is disposed in the upper rectangular portion of frame 100 between members 112, 114, 120 and 122. The ceiling 200 includes longitudinal members 202, 204, 205 and 206, cross members 208, bars 210, and access panels 212.

Member 202 includes a plurality of holes disposed perpendicular to the plane of the ceiling 200. The holes accommodate in sliding relation the bars of the wall 400.

The access panels 212 are disposed between longitudinal members 202 and 204 and between the cross members 208. The access panels 212 are rotatably disposed on the ceiling 200 preferably by hinges 216 and can be held in place by latches 218. Four access panels 212 are shown, but their number can be varied or they can be eliminated if desired. Furthermore, the access panels 212 preferably include restraints such as bars 210 but may include glass or plexiglass.

Figure 4:
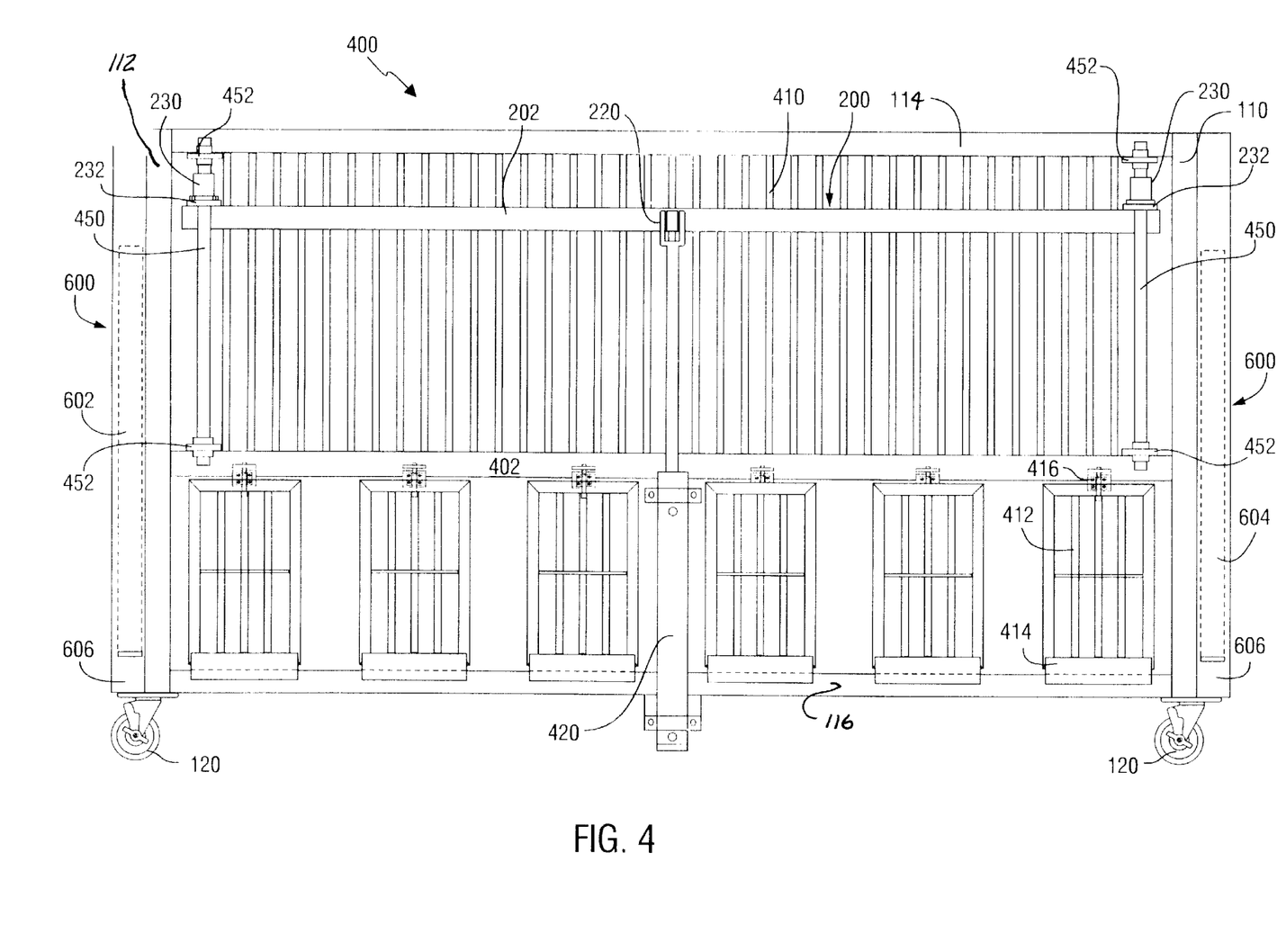
FIG. 4 illustrates the preferred stationary wall.

The ceiling 200 is preferably moved by a hydraulic cylinder 420 shown in FIG. 4 and describe in the wall 400 section.

Movement of the ceiling 200 is guided by the bearings 230 and 240. Bearings 230 are disposed on longitudinal member 202 by plates 232. Bearings 240 are disposed on member 205 by plate 242. Bearings 230 have support 450 passing through them which are part of the wall 400. Bearings 240 also have supports 350 passing through them that are part of lateral wall 300.

Also illustrated in FIG. 2 are the bearings 330 that guide the movement of the wall 300. Supports 250 are disposed between longitudinal members 204 and 206 are disposed in sliding relation within bearings 330.

2. Moveable Wall 300

Figure 3:
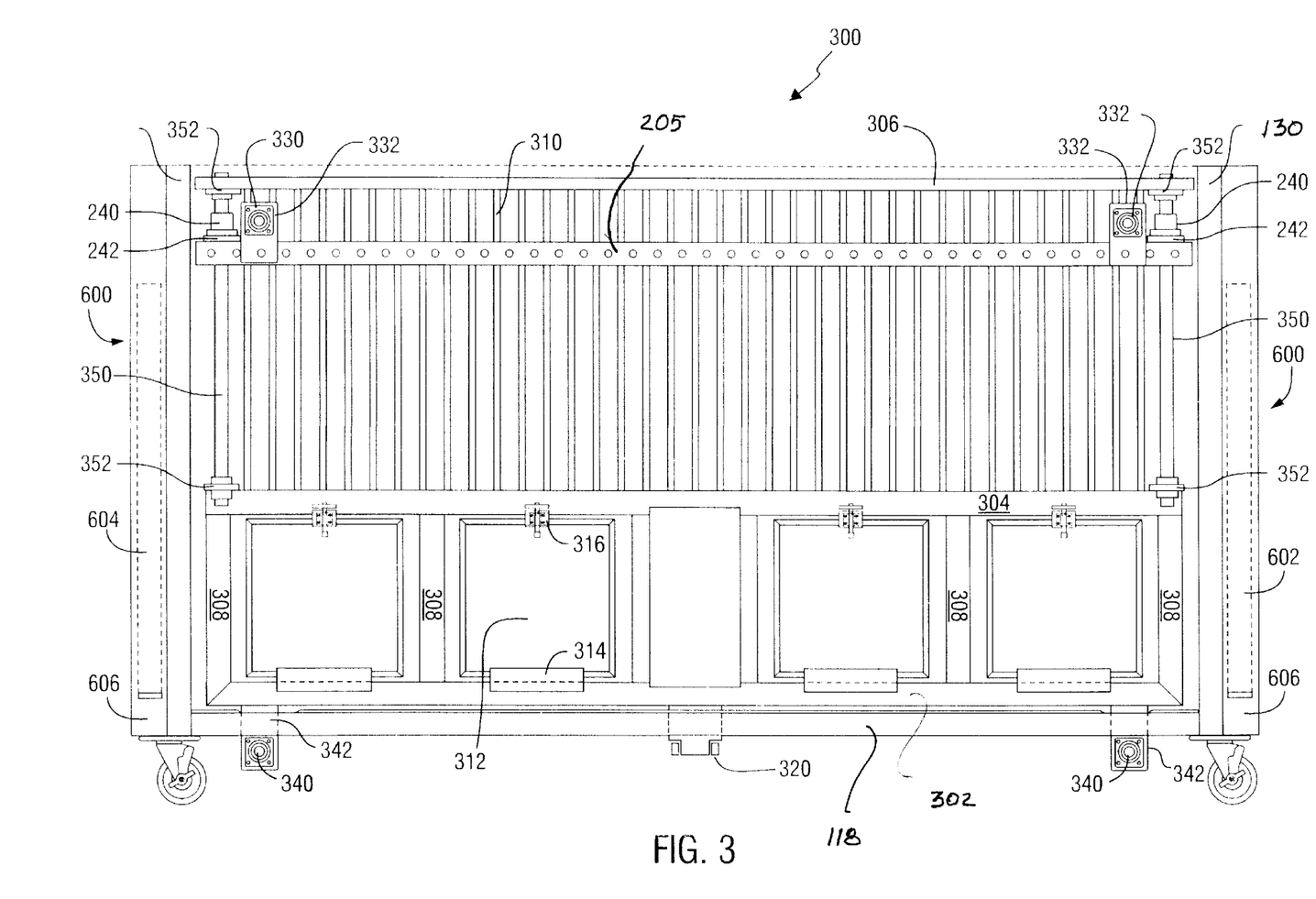
FIG. 3 illustrates the preferred movable wall.

FIG. 3 shows the wall 300 which is disposed between frame members 112, 118, 130 and 132. Wall 300 comprises longitudinal members 302, 304, 205 and 306, cross members 308, bars 310, and panels 312.

Bars 310 are disposed between longitudinal members 304 and 306 and through member 205 in slidable relation. A clevis assembly 320 is disposed on member 302.

The access panels 312 are disposed between longitudinal members 302 and 304 and between cross members 308. Access panels 312 are rotatably disposed on wall 300 preferably by hinges 314. Latches 316 may be used to hold the panels 312 in place. Panels 312 may be made of various materials including metal, glass or plexiglass. The four preferred access panels 312 are shown. However, the panels 312 maybe increased, decreased or eliminated if desired.

Bearings 330 are disposed on member 205 by plates 332. Supports 350 are disposed between members 306 and 304 and disposed through member 205 and bearings 240 in sliding relation. Bearings 340 are disposed on longitudinal member 302 by plates 342. The support 550 that passes through bearings 340 are disposed on the floor 500. The support will be discussed with reference to FIG. 5.

Member 205 is disposed on sliding relation with both ceiling 200 and movable wall 300. Member 205 includes a plurality of holes through which the ceiling bars 210 and the moveable wall bars 310 are slidably disposed. The restraining bars 210/310 pass through member 205 in sliding relation. Accordingly, member 205 defines an upper corner of the cage.

Preferably, wall 300 is not connected to frame 100, but instead moves within the frame 100. Wall 300 is moved in response to activation of a drive system 700 that will be discussed later.

3. Wall 400

Wall 400 is shown FIG. 4 and is disposed within frame 100. Wall 400 comprises frame members 114, 116, 134 and 136, longitudinal member 202, 402, bars 410, and access panels 412.

Access panels 412 are disposed between longitudinal member 402 and cage frame member 116. Access panels 412 are preferably rotatably disposed on stationary wall 400 by hinges 414 and may be held in place by latches 416. While six access panels are shown, but their number can be varied or they can be eliminated if desired.

The restraining bars 410 are disposed between longitudinal member 402 and cage frame member 114. Longitudinal member 202 includes holes through which restraining bars 410 are disposed in slidable relation. The ceiling 200 can be moved by the drive system 700 that includes hydraulic cylinder 420, which is disposed between frame member 116 and a clevis assembly 220 disposed on member 202.

Also show in FIG. 4 are the bearings 230. Supports 450 are disposed between longitudinal members 402 and the cage frame member 114 by plates 452 and are disposed in sliding relation with bearings 230.

4. Floor 500

Figure 5:
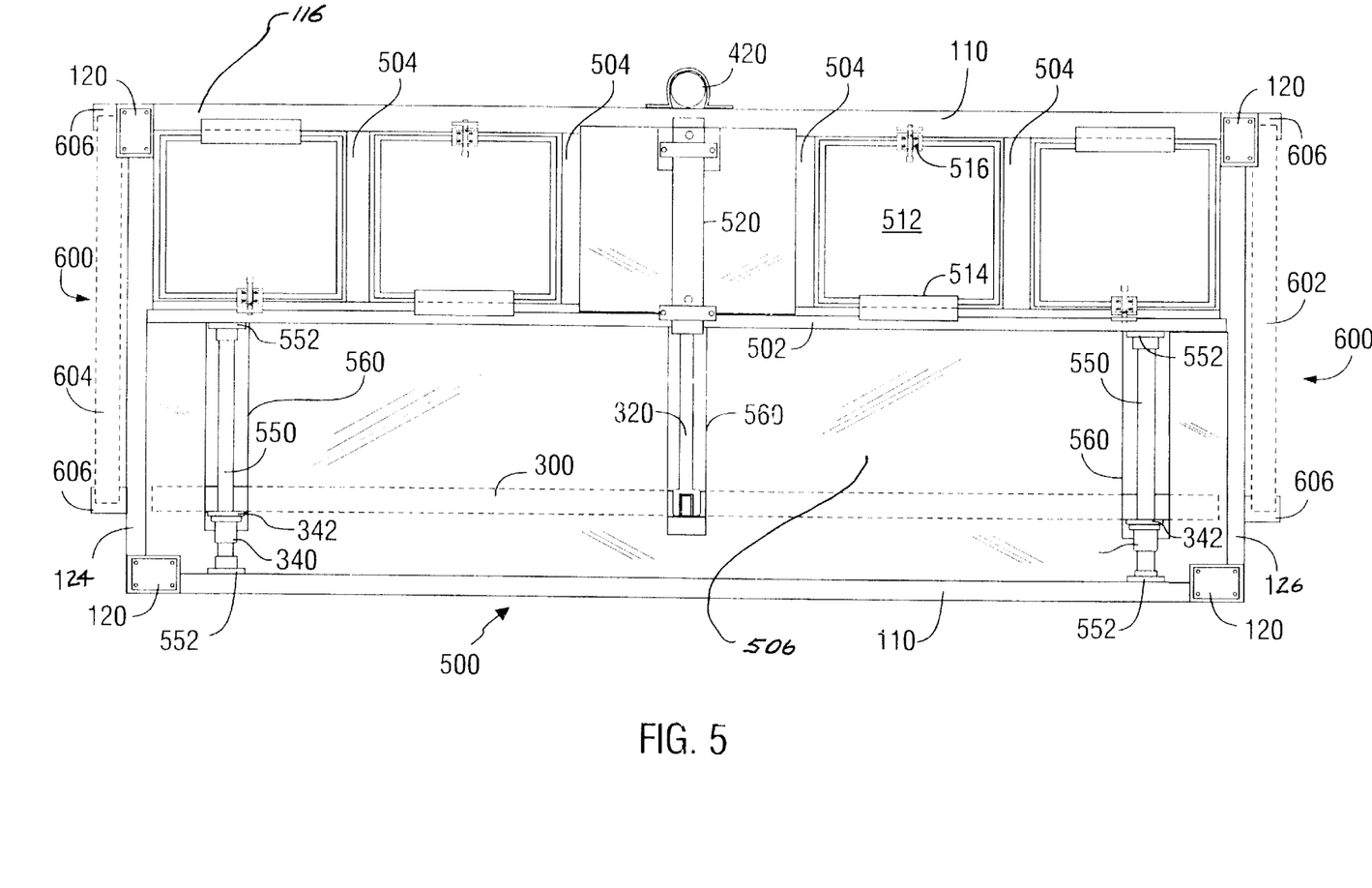
FIG. 5 illustrates the preferred floor.

Floor 500 is shown in FIG. 5. Floor 500 is disposed on frame 110. Floor 500 comprises members 116, 118, 124 and 126 longitudinal member 502, cross members 504, panel 506, and access panels 512.

The access panels 512 are disposed between longitudinal member 502 and cage frame member 116 and between cross members 504. Access panels 512 are preferably rotatably disposed on floor 500 by hinges 514 that may be held in place by latches 516. Four access panels are shown, by the number can be varied or they can be eliminated if desired.

Panel 506 is disposed between longitudinal member 502 and frame members 110, 124 and 126. Panel 506 is preferably made of a solid sheet of reinforced aluminum. Cut outs 560 are disposed in the panel 506 to accommodate the wall 300 drive assembly components.

Wheel assemblies plates 120 are disposed on the four corners of floor 500. Supports 550 are disposed between member 502 and frame member 118. Bearings 340 are disposed in sliding relation on supports 550 to accommodate and align the movement of wall 300.

Back wall 300 is shown in FIG. 5 with portions not visible as a dotted lines. Movable wall 300 is moved by the drive system 700 that includes a hydraulic cylinder 520 and clevis assembly 320. The hydraulic cylinder 520 is preferably disposed between frame member 116 and wall 300 where the supports 550 are aligned with the openings 560.

5. Door Assemblies 600

The door systems 600 are shown in FIGS. 1, 5, 6 and 9–12. One door system 600 is disposed on each end of the cage. Each door system 600 includes door 602 having a frame 604, cross member 606 and bars 608 disposed on track assembly 610. The track assembly 606 is disposed on cage frame 100 and allows the door 602 to slide up and down to allows an animal to enter, exit, or be confined within cage 100.

Figure 6:
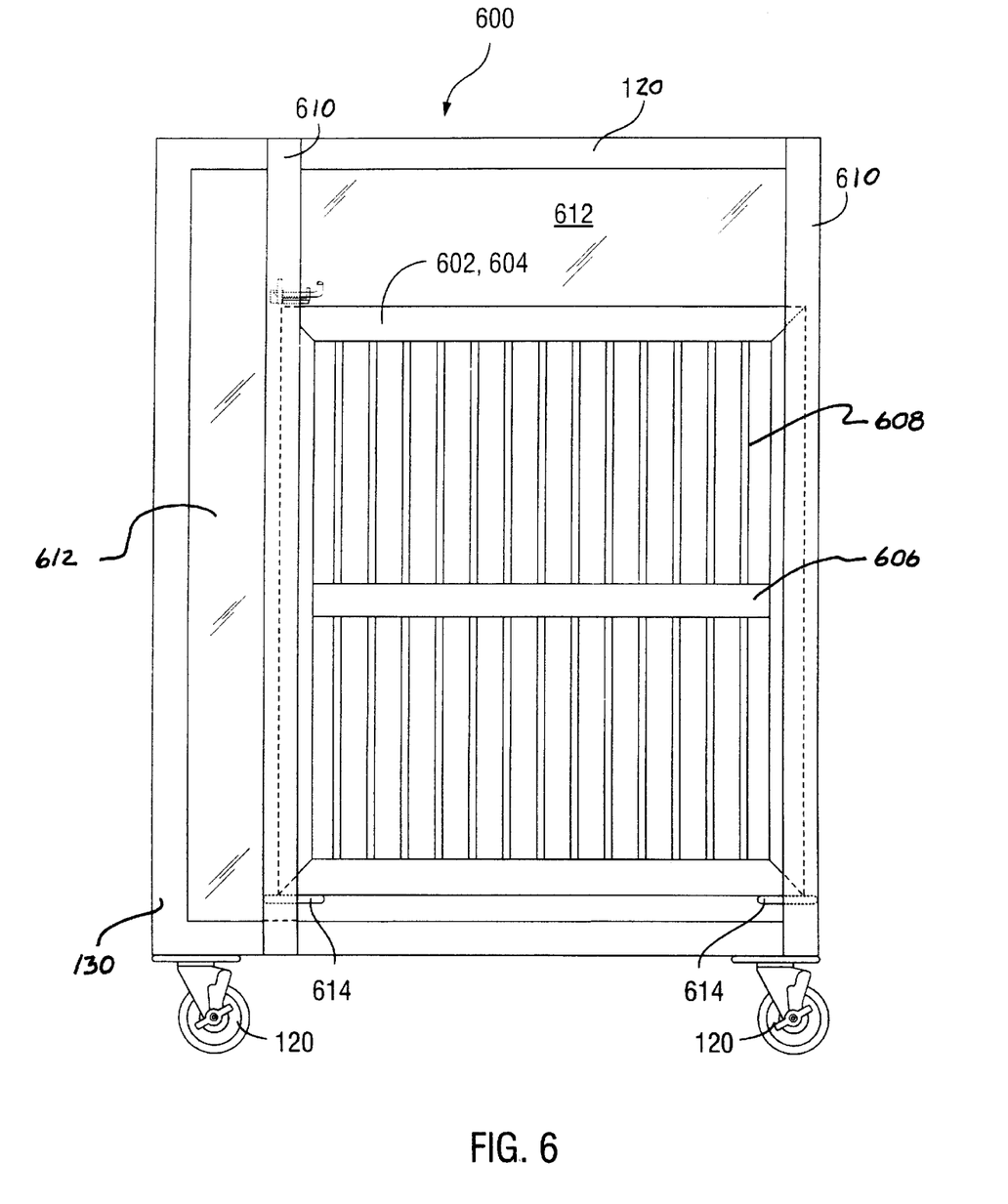
FIG. 6 illustrates the preferred door assembly.

Panels 612 are disposed to cover the section of the ends of the cage 10 not covered by the door 602. The panels 612 are preferably made of an aluminum sheet but other materials may be used to suit the application.

Door stops 614 are disposed at the base of the tracks 606. A latch 614 is disposed on track 606 above the upper edge of the 602 door.

While the preferred cage design includes door assemblies on both ends that are identical, the doors may be different, or may be hinged similar to the access panels present of the other cage walls.

FIGS. 9, 10, 11 and 12 depict a second preferred door system 602. This door system 602 operates in the same fashion as the first preferred system but includes an additional expansion section 620 and linear movement system 630 which permits the expansion section 620 to move laterally within the cage. This addition allows the cage to restrict an animal in a third dimension.

The expansion section 620 includes a horizontal extension 622, a vertical extension 624 and an adjustable plate 626 that is disposed between the horizontal section and the vertical section as they are extended. The plate 628 covers the portion of the cage which is not covered by either the vertical or horizontal extensions.

Figure 12:
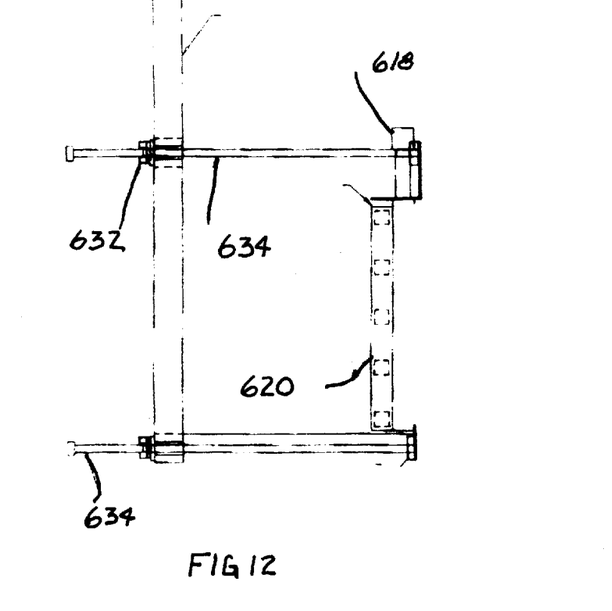
FIG. 12 illustrates a side view of the door expansion section linear movement system.

The second preferred door also includes a linear movement system 630. The linear movement system 630 is a controlled motion system which allows the expansion section 620 to be slid into the cage 10. This system 630 includes bearings 632 disposed in the frame 604 and cross members 606. Push-rods 634 are disposed between the expansion section 620 and the cross members 606 and through the bearings 624 in sliding relation.

6. Drive System 700

Movement of the ceiling 200 and wall 300 of the preferred embodiment is accomplished by a drive system 700. Preferably, the drive system 700 includes the hydraulic cylinders 420 and 520. Cylinder 420 is used to raise and lower the ceiling 200 while cylinder 520 is used to extend and retract the moveable wall 300.

The preferred drive system is hydraulic. However, other drive systems such as mechanical, electromechanical and pneumatic systems may also be incorporated. Use of these various systems is dependent on the application to which the system will be implemented.

B. Construction

The materials and manufacturing methods used to construct the restraining cage of the present invention may vary according to the application in which the cage is to be used and to the size of the animal to be accommodated. The construction details set forth below are most suitable for medium size primates, canines or felines. To accommodate animals of different sizes, the construction details should be tailored in accordance with the animal's shape, size, weight and strength. The construction details should also be tailored to the environment in which the cage will be exposed.

The restraint cage 10 is preferably constructed from durable and corrosion resistant materials that will provide long term usage in harsh and corrosive operating conditions. Corrosion resistant components make the cage compatible for use in either outdoor or indoor applications. Suitable materials include galvanized steel, stainless steel, or aluminum.

The cage parts are preferably fabricated from aluminum tubing, sheets, bars, and rods. Stainless steel rods, case-hardened steel shafts, and high capacity linear bearings are preferred for the telescoping or moving components of the cage such as the supports and hydraulic cylinders. Preferably, cage components should be assembled using fully penetrating welds or high stress steel fasteners to ensure durable and reliable operation.

Ideally, 2×2 inch and 2×1 inch rectangular aluminum tubing with 3/16 inch thick walls is used to form the main structural members of the frame 110. One inch square aluminum tubing with 1/8 inch thick walls can form the subsidiary framing components for the access panels 212, 312, 412 and 512. Restraining bars are preferably 5/8 inch in diameter. Aluminum sheet of 1/8 inch thickness is preferred for panels 504 and 612 of the cage floor and doors.

Heavy duty self-lubricating Frelon™ lined linear bearings with a dynamic capacity of 1470 pounds are preferred bearings 230, 240, 330, and 340. The bearings should be housed in sealed casings that help repel dirt and debris, and resist, water, oil, hydraulic fluids, dust, and daily wash-downs. The supports are ideally three-quarter inch diameter case hardened steel shafts that provide a smooth surface for the bearings to ride on and are resilient to impact loads from the animal.

The restraining bars in the moving sections of the walls of the restraint cage offer additional stability to the cage and assist in retraction and expansion of the walls. They should be uniformly spaced to provide clear gaps that preferably do not exceed 1.5 inches to adequately restrict the animal from accessing areas outside the cage. Similarly, the access panels in the cage should be designed with gaps of 1.5 inches between the access panel and the cage to eliminate "pinch" hazards to the animal and handler when opening and closing the panels.

The doors systems 600 should preferably include in HDPE (High Density Polyethylene) tracks 606 to ensure fast opening and closing of the doors. This allows safe animal entry and exit into and out of the cage. The doors 602 may also be designed as bi-parting gates to allow single motion open and shut operation.

C. Operation

Figure 7:
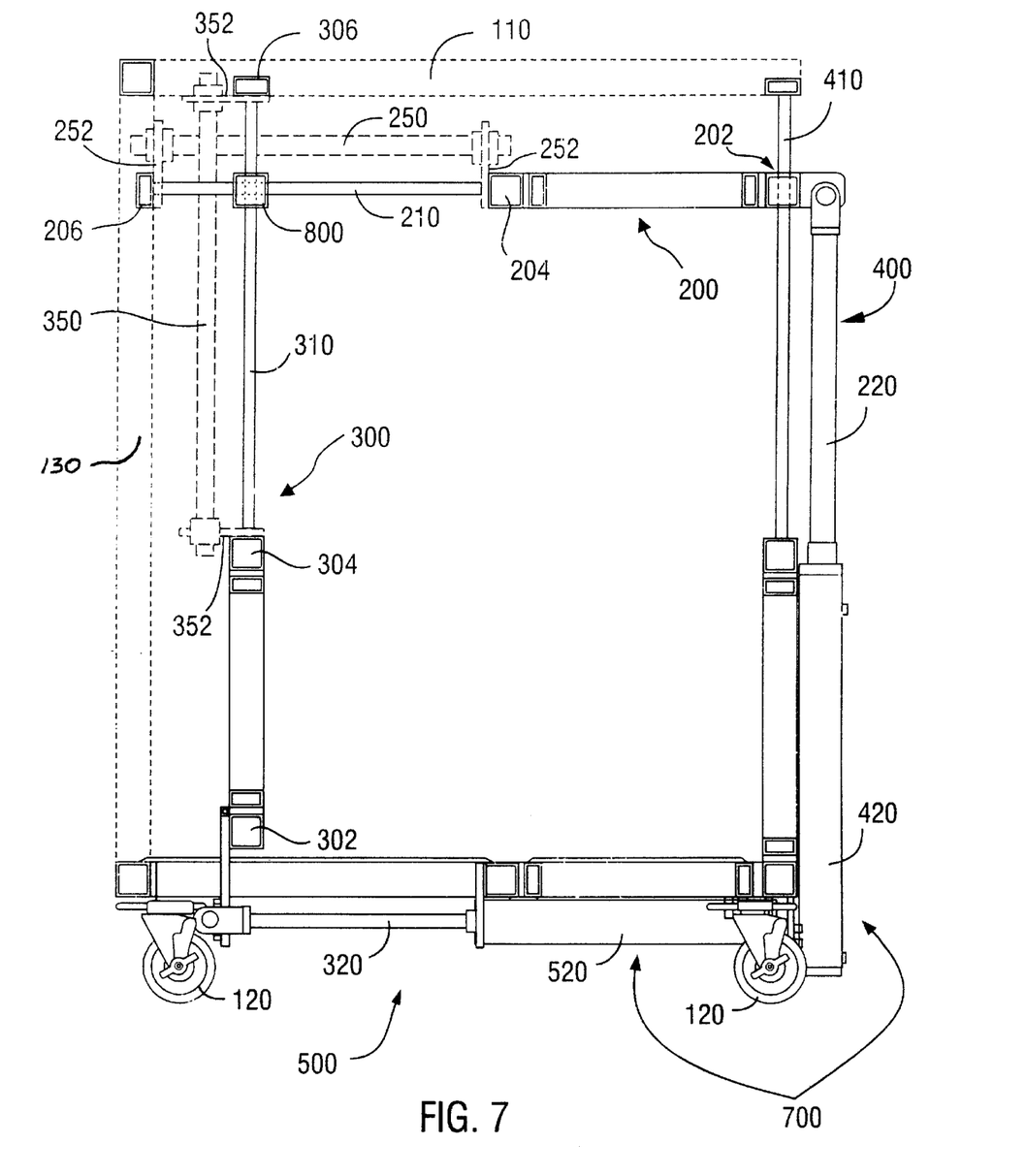
FIG. 7 is a cross-sectional view of the cage where the ceiling and the movable wall are extended.
Figure 8:
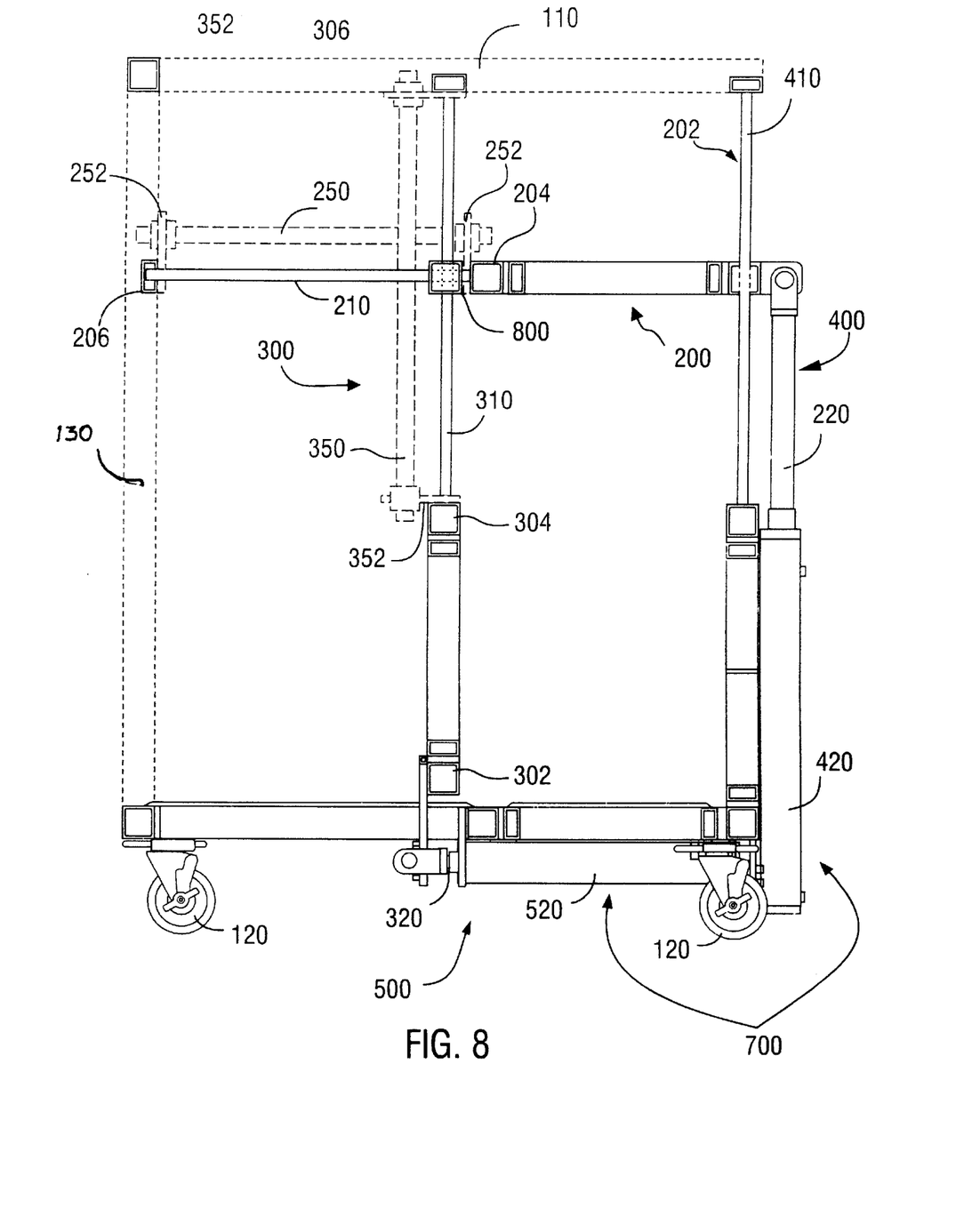
FIG. 8 is a cross-sectional view of the cage where the ceiling and the movable wall are retracted.
Figure 9:
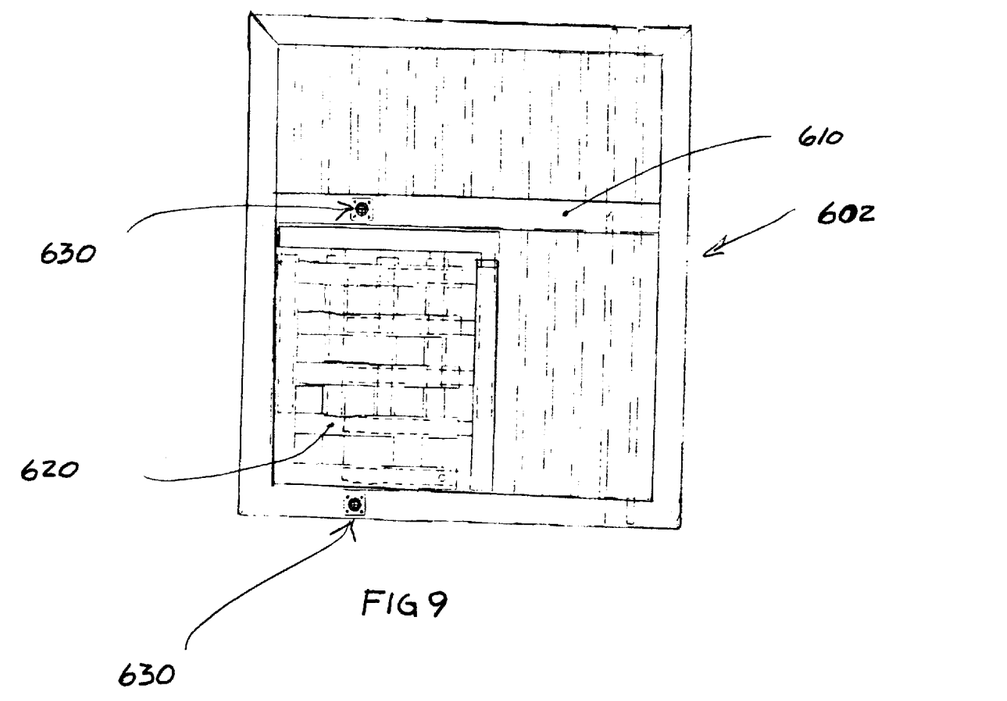
FIG. 9 illustrates the preferred adjustable door.
Figure 10:
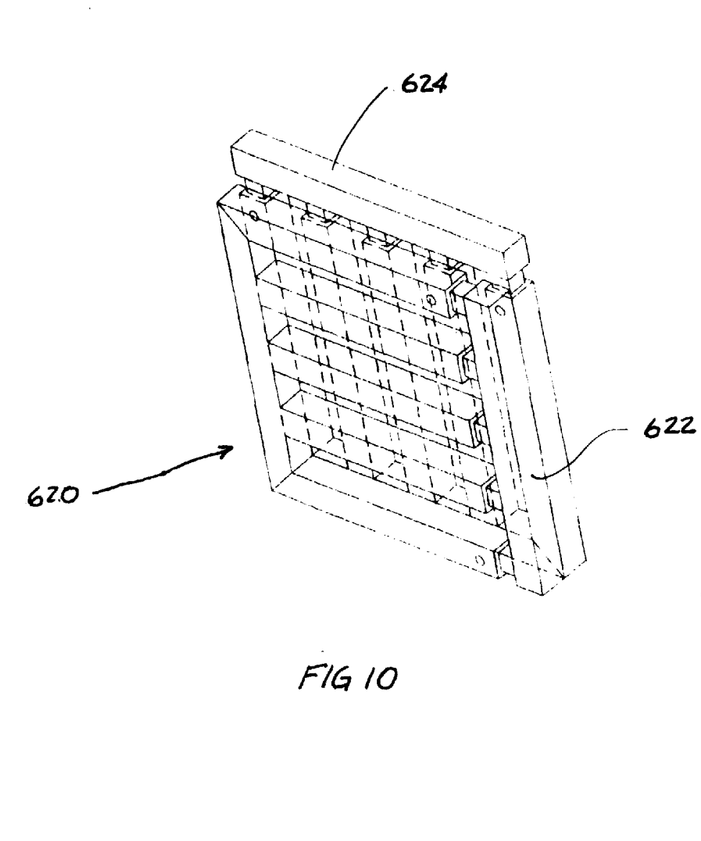
FIG. 10 illustrates the adjustable portion of the door retracted.
Figure 11:
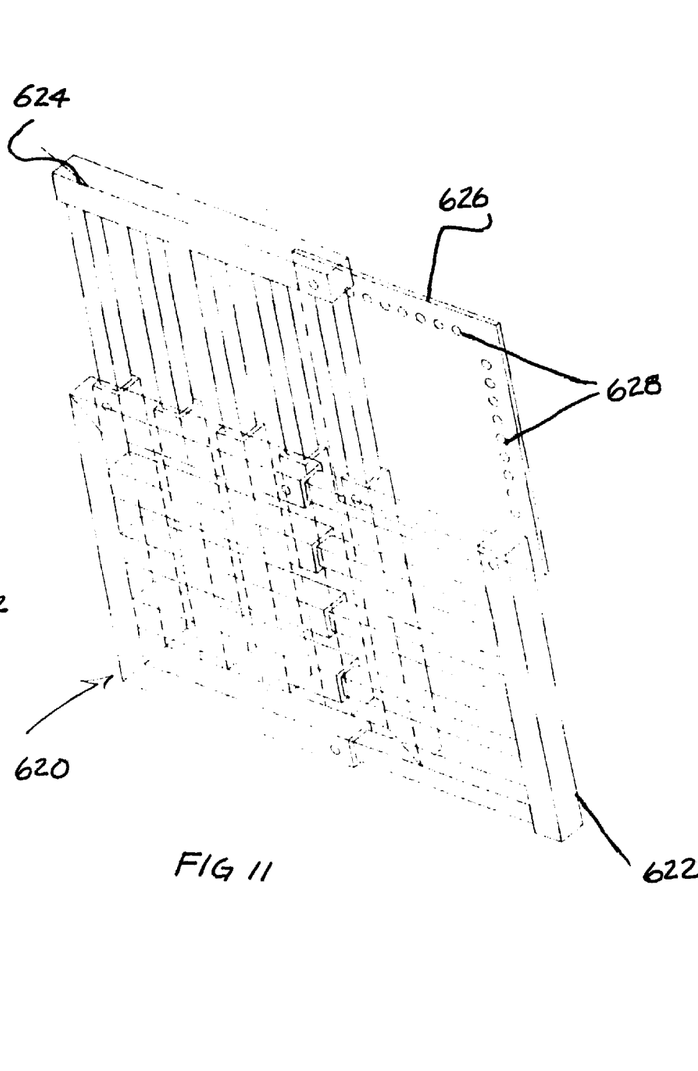
FIG. 11 illustrates the adjustable portion of the door extended.

In the preferred embodiment the ceiling 200 and wall 300 move to allow a handler to restrain an animal's movement in the cage. FIGS. 7 and 8 show cross-sectional views of the cage 10 that illustrate the movement of the wall 300 and the ceiling 200 with respect to one another. FIG. 7 shows both the ceiling 200 and wall 300 in a mostly extended position. FIG. 8 shows wall 300 in a fully retracted position and ceiling 200 in a partially retracted position. It is important to note that preferably the ceiling 200 and wall 300 move independent of each other. Thus, the ceiling may be fully retracted while the wall is in its fully extended position and vice versa.

Preferably the walls are moved using a hydraulic system. The hydraulic system comprises cylinders 420 and 520, which are used to move ceiling 200 and movable wall 300, respectively. The cylinders 420 and 520 are coupled to arm and clevis assemblies 220 and 320, respectively.

When ceiling 200 is moved in response to activation of cylinder 420, restraining bars 410 on the stationary wall 400 will move freely through longitudinal member 202 of ceiling 200. Also, restraining bars 310 on the movable wall 300 will move freely through member 205. Similarly, when movable wall 300 is moved in response to activation of cylinder 520, restraining bars 210 on ceiling 200 will move freely through member 205.

Drive system 107 may be operated by a manual hand-cranked pump to actuate the hydraulic cylinders connected to the movable walls 104 and 106. While the cylinders are ideally actuated independently of one another, the hydraulic system can be configured to provide simultaneous movement to the movable walls to achieve the necessary containment profile.

The hydraulic cylinders ideally have line mounted three position manual detent valves that control the direction of operation. The three positions on the valve switches allow for closing, opening, and locking each of the cylinders irrespective of the direction of flow in the hydraulic system. Check valves in the system ensure against back flow of the hydraulic fluid and maintain pressure and lock the cylinders in the desired containment profile. Using this type of hydraulic system, locking the restraint in a specific containment profile is as simple as turning a switch to a closed position.

Care should be taken to place the hydraulic fluid reservoir used to activate the cylinders 108 and 110 out of reach from the restrained animal. While a hydraulic system is preferred to move the various walls of the cage, other types of drive systems, including pneumatic systems, electric electromechanical or screw-type systems, may be used.

The restraining cage of the present invention lends itself to a variety of beneficial adaptations. Also, tunnel adapters can be connected to the cage to attach the cage to a facility chute or holding cell, thus ensuring a smooth transition of an animal into and out of the restraint cage. Furthermore, rotational capabilities may be added to the cage in the form of an add on frame that hooks to the restraint cage with quick disconnect type adapters to allow the cage to be rotated a full 360 degrees. This allows manipulation of the animal and provides complete animal access through the access panels.

D. Conclusion

The disclosure sets forth some ways of using the claimed invention. Other adaptations of the present invention are also possible. For instance, the cage design can be adapted to restrict movement in more than two dimensions, although that degree of restraint may not always be necessary. Also, the other cage's planar surface (e.g., the floor, other lateral walls, or the door assemblies) may also be adapted to move consistently with the spirit of this invention.

Also, many variations in the drive system are possible as one of ordinary skill in the art will recognize. For instance, while the disclosed cage design shows the use of a single hydraulic cylinder to move each movable wall, more than one cylinder could be used.

Furthermore, other types of drive systems such as mechanical and electromechanical systems may be used to control the movement of the planar surfaces. The choice of drive system may be made based on the application involved.

The various linear bearings may be eliminated and replaced by cylinders to be connected at the four corners of the movable walls or ceiling. In such a design, one of ordinary skill will realize that the fluid pressures in each of the cylinders will need to be equalized to facilitate even movement.

The disclosed restraining cage is also adaptable to differing uses. While confined animal restraint aspect is certainly an important advantage of the disclosed invention, it is not so limited. A cage designed according to the present invention is also versatile in that it can comfortably house animals of different sizes in a non-confrontational setting without the need of buying separate cages of differing sizes. The disclosed cage also be used to secure animals for transport.

What is claimed is:

1. An animal cage comprising:
   a. a floor having at least one access panel;
   b. two walls each having at least one access panel disposed parallel to each other and above and perpendicular to the floor;
   c. two doors disposed parallel to each other and perpendicular to the floor, ceiling and two walls;
   d. at least one of the walls is moveable in relation to the floor and ceiling;
   e. either the floor or ceiling is moveable in sliding relation with the walls;
   f. a means for coordinating the movement of the moveable wall with respect to the moveable ceiling or floor;
   g. at least one of the doors is moveable in relation to the floor, ceiling and two walls;
   h. a means for independently controlling the movement of the moveable door, moveable wall, moveable ceiling and/or moveable floor.

2. A cage according to claim 1 where the means for independently controlling the movement is a hydraulic system.

3. A cage according to claim 1 where the means for independently controlling the movement includes an electrically controlled system.

4. A cage according to claim 1 where the means for independently controlling the movement is a mechanical system.

* * * * *